United States Patent [19]

de Hond

[11] Patent Number: 5,796,395
[45] Date of Patent: Aug. 18, 1998

[54] SYSTEM FOR PUBLISHING AND SEARCHING INTERESTS OF INDIVIDUALS

[75] Inventor: Maurice de Hond, Amsterdam, Netherlands

[73] Assignee: Wegener Internet Projects BV, Apeldoorn, Netherlands

[21] Appl. No.: 815,461

[22] Filed: Mar. 11, 1997

Related U.S. Application Data

[60] Provisional application No. 60/014,662, Apr. 2, 1996.
[51] Int. Cl.[6] .............................. G06F 3/00; G06F 15/163
[52] U.S. Cl. ........................ 345/331; 345/332; 345/349; 345/968; 395/200.33
[58] Field of Search .......................... 345/331, 332, 345/329, 330, 349, 348, 334, 335, 968, 357; 395/200.31–200.33, 200.47–200.49; 707/3, 6, 501, 513

[56] References Cited

U.S. PATENT DOCUMENTS

| | | | |
|---|---|---|---|
| 4,974,173 | 11/1990 | Stefik et al. | 345/331 |
| 5,319,747 | 6/1994 | Gerrissen et al. | 345/349 |
| 5,347,632 | 9/1994 | Filepp et al. | 395/200.32 |
| 5,664,126 | 9/1997 | Hirakawa et al. | 345/329 |
| 5,694,594 | 12/1997 | Chang | 707/501 X |

OTHER PUBLICATIONS

"Learning From Hotlists and Coldlists: Towards a WWW Information Filtering and Seeking Agent," Michael Pazzani et al., Jan. 1, 1995, pp. 492–495.
"Sociable Information Spaces," Judith S. Donath, IEEE, 1995, pp. 269–273.
"A Wide Area Network Information Filter", M. F. Wyle, IEEE, 1991, pp. 10–15.

Primary Examiner—Raymond J. Bayerl
Attorney, Agent, or Firm—Wells, St. John, Roberts, Gregory & Matkin, P.S.

[57] ABSTRACT

A method for publishing and searching interests of individuals, the method including providing a memory bearing software for performing the following: providing to a user a request for data by providing a plurality of selectible differing graphics icons respectively having the appearance of a house, receiving a selection, adding the selection to a database and associating the selection with the user who made the selection, communicating to the user who selected a house icon a list of possible interests of the user, receiving a selection of interests from the user, adding the selected interests to the database and associating the selected interests with the house icon selected by the user who selected the interests, communicating to a user a form for use in requesting a search of the database, and generating graphics having the general appearance of a plurality of houses after the search is performed, in which the houses are respectively selectible by the user, and communicating to the user who uses the search request form the interests of the user associated with a house if that house is selected.

20 Claims, 16 Drawing Sheets

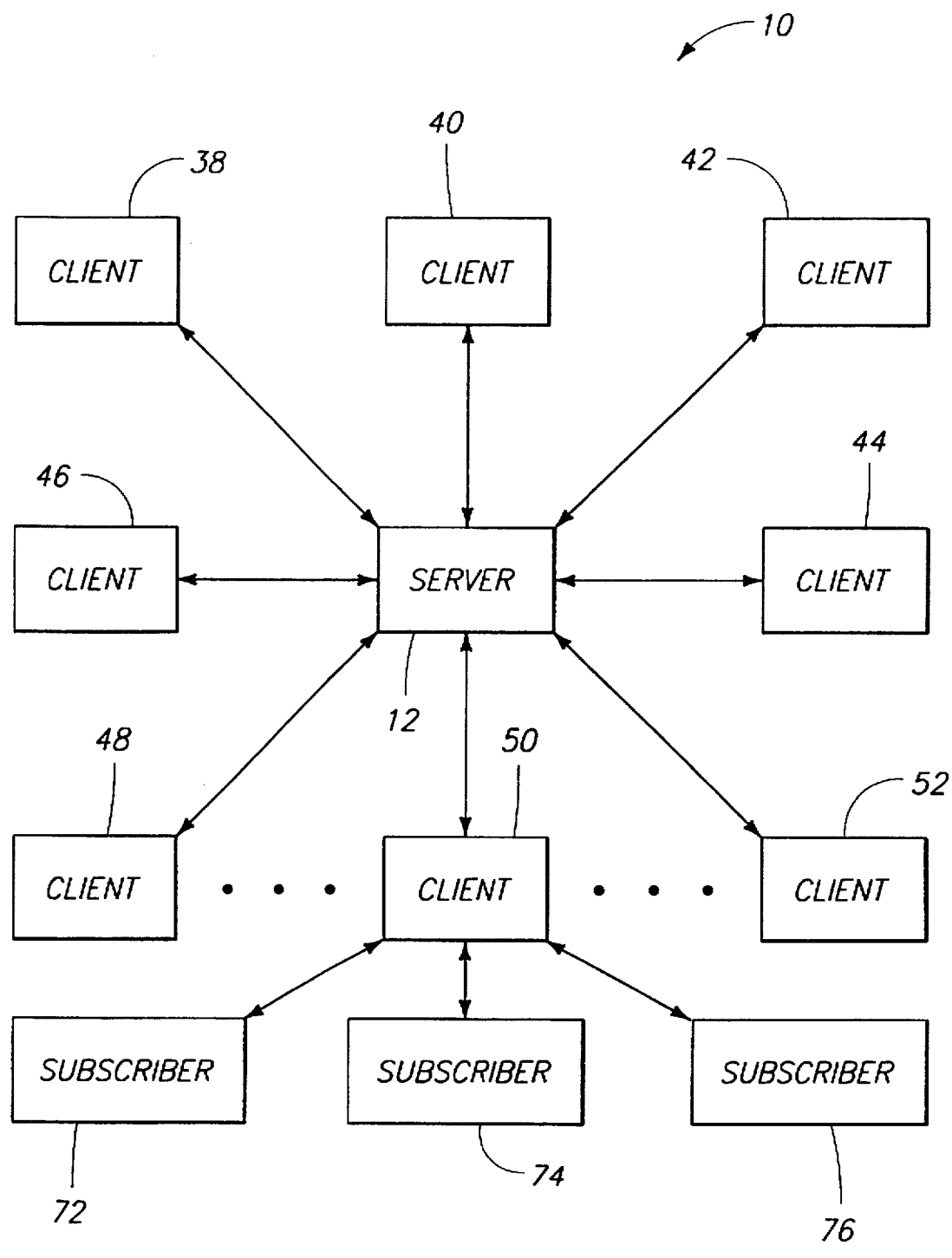

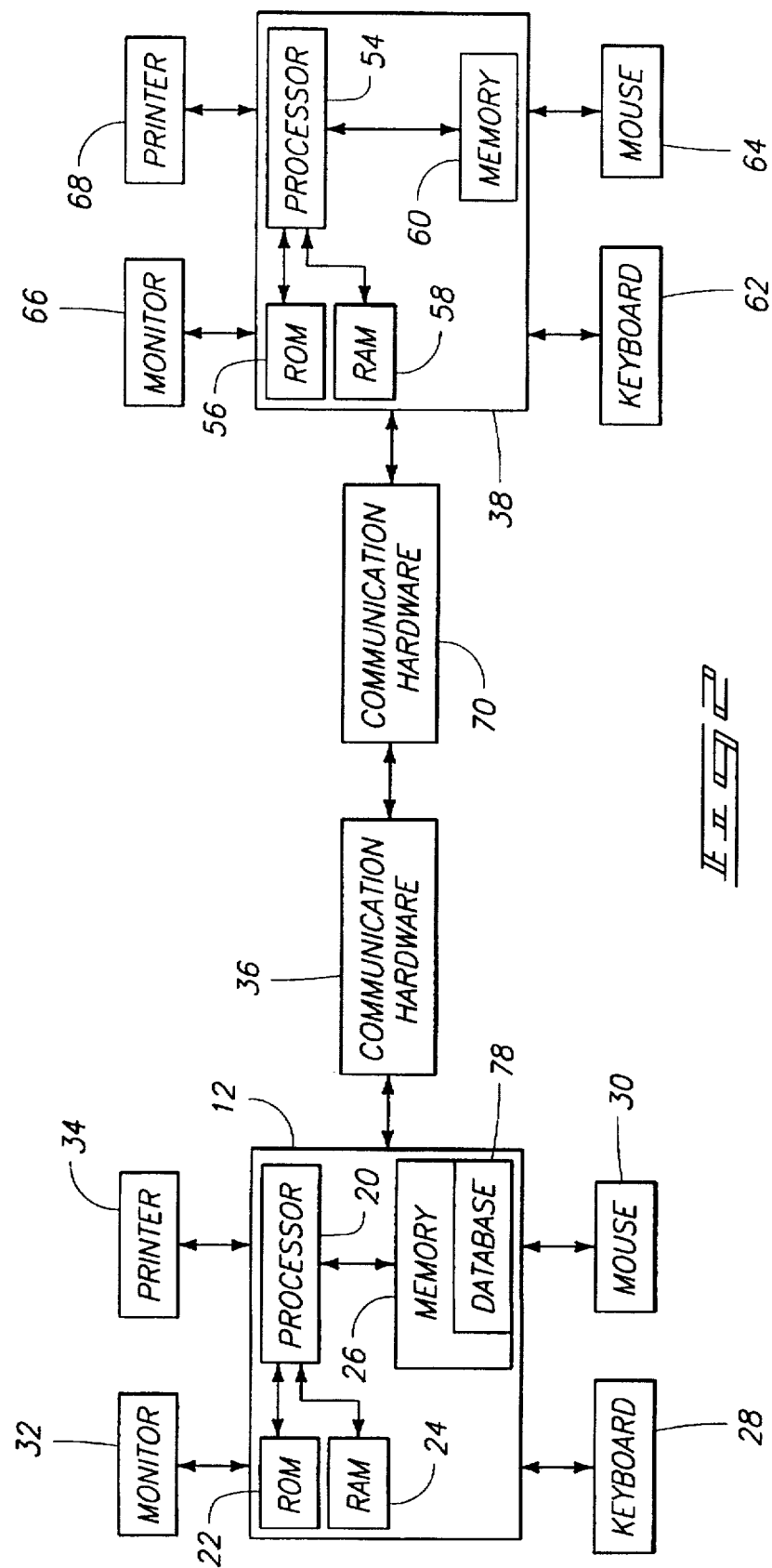

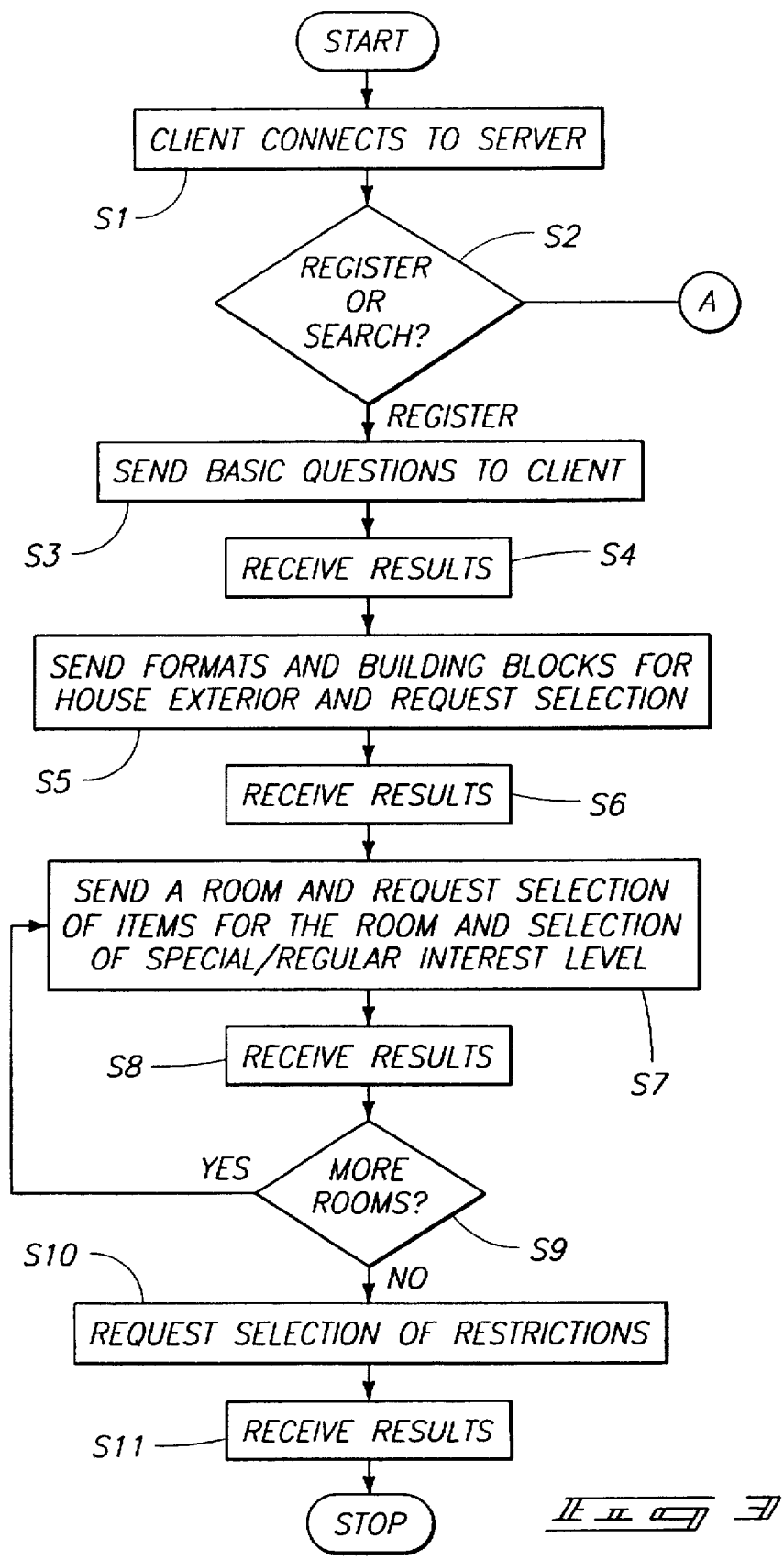

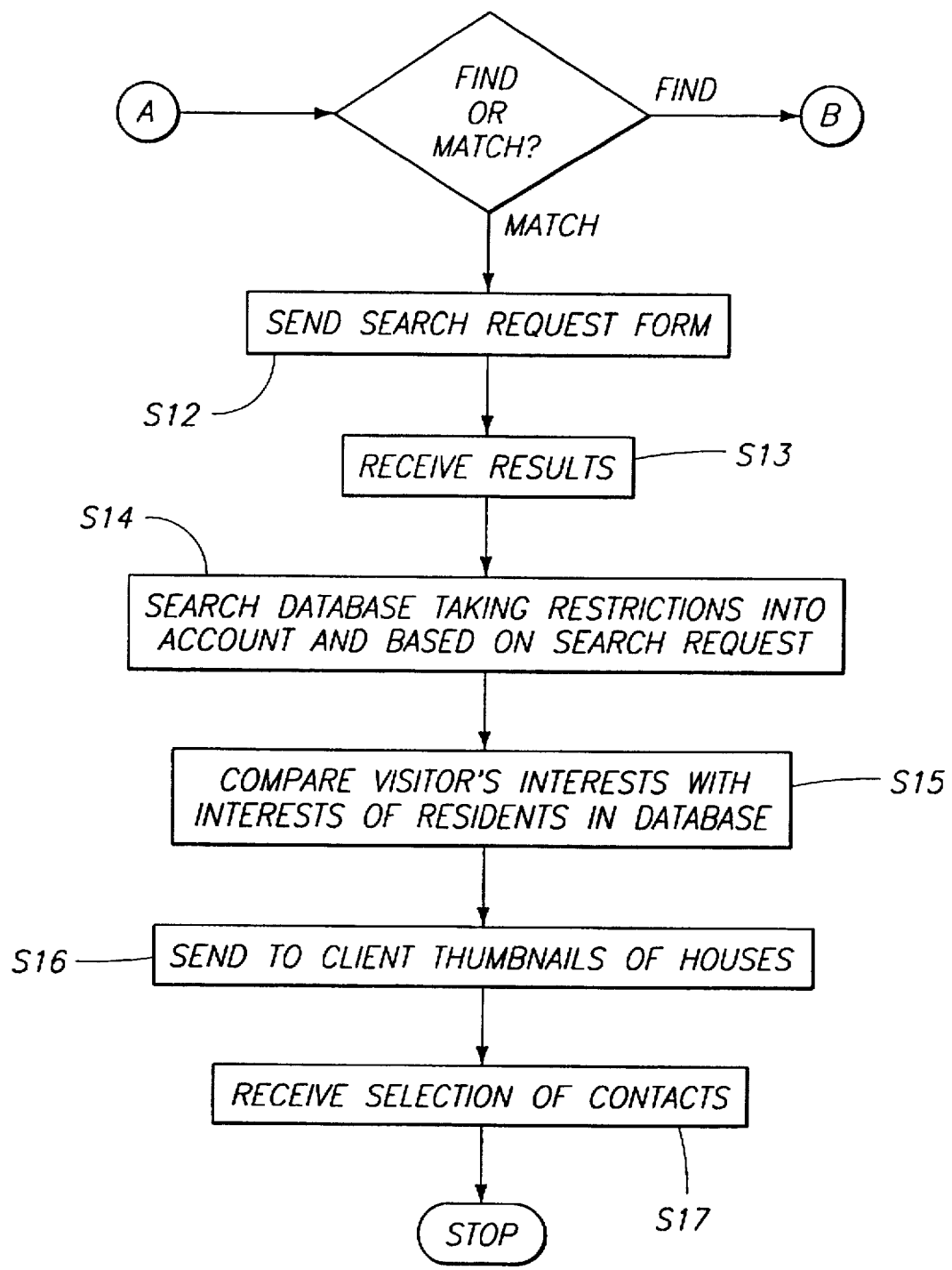

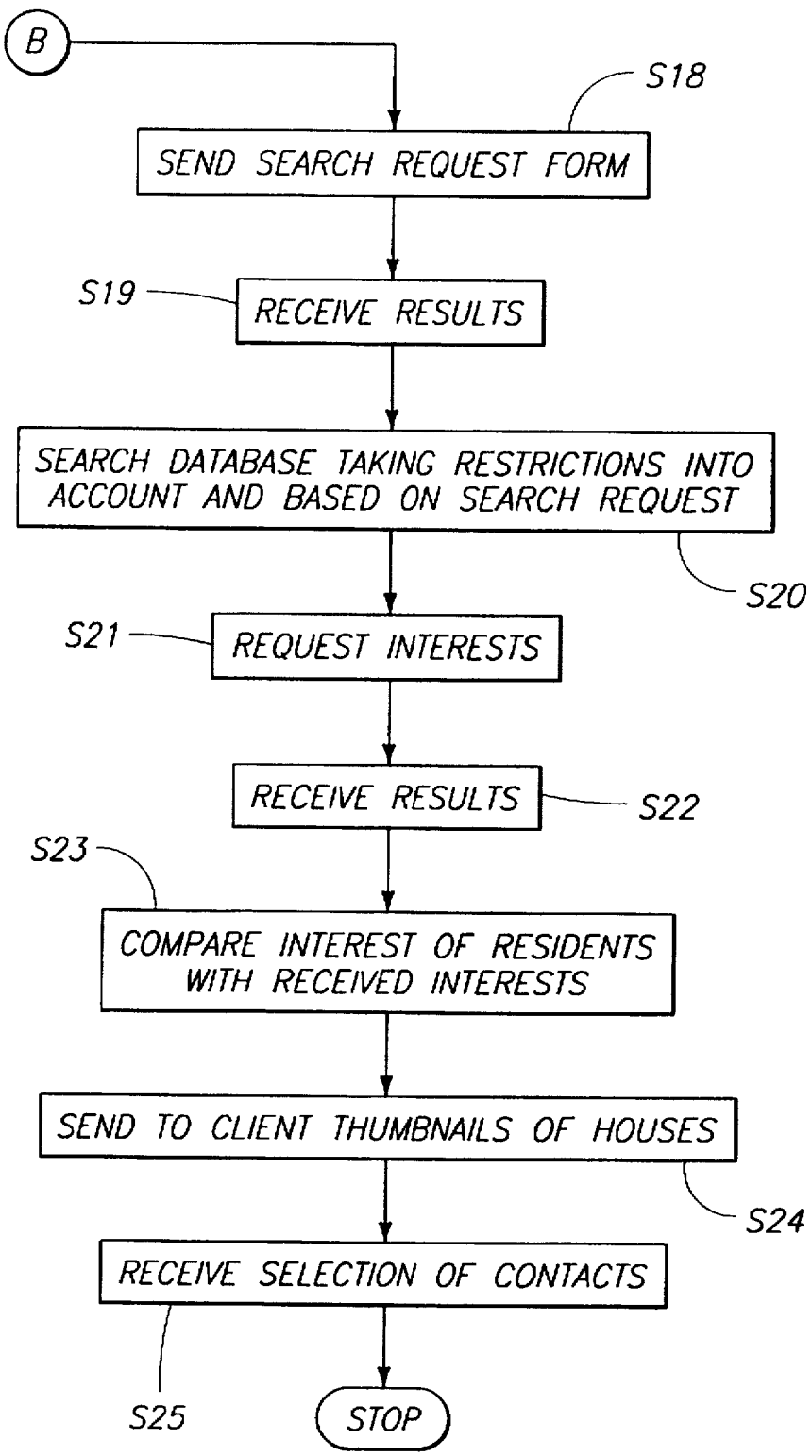

Fig. 6

| Mail | My house | Street | Clubhouse | | ? 🔍 |

| Your house | My profile | Agenda | My publication | Friends | Adjust house |

There are only four steps to enter your new house

Guest, Welcome to your future house at City OnLine. You just have to take four steps before you can enter your new house. To begin with, we need some personal information. You can use your real name, but you can also use an alias. Click here so you can read why we need this information. ← 176

Step 1: Personal Information:

Nick name: [ ] ← 80

Real name: [ ] ← 82

Postcode: [ ] ← 84  Choose your city: ← 88    86 ↓ [Choose your city] ← 86

E-mail address: [ ] @ [ ]

You will receive a welcome note at your e-mail address. We will also check your address so (please) make sure your e-mail address is correct.

Date of birth (dd-mm-yyyy): [ ]-[ ]-[ ] ← 90

Sex: m○ f○ ← 92

Security system:
Password: [ ] ← 94
Just to make sure, enter your password again: [ ] ← 96
Reminder: [ ] ← 98

By entering a reminder, it will be easier to remember your password. Make sure you are the only one who understands the reminder so that other people will not be able to discover your password.

City OnLine will not use your e-mail address for commercial purposes. If you do not wish to receive this kind of mail, mark the grey square. [ ] ← 100

[ GO TO STEP 2 ]

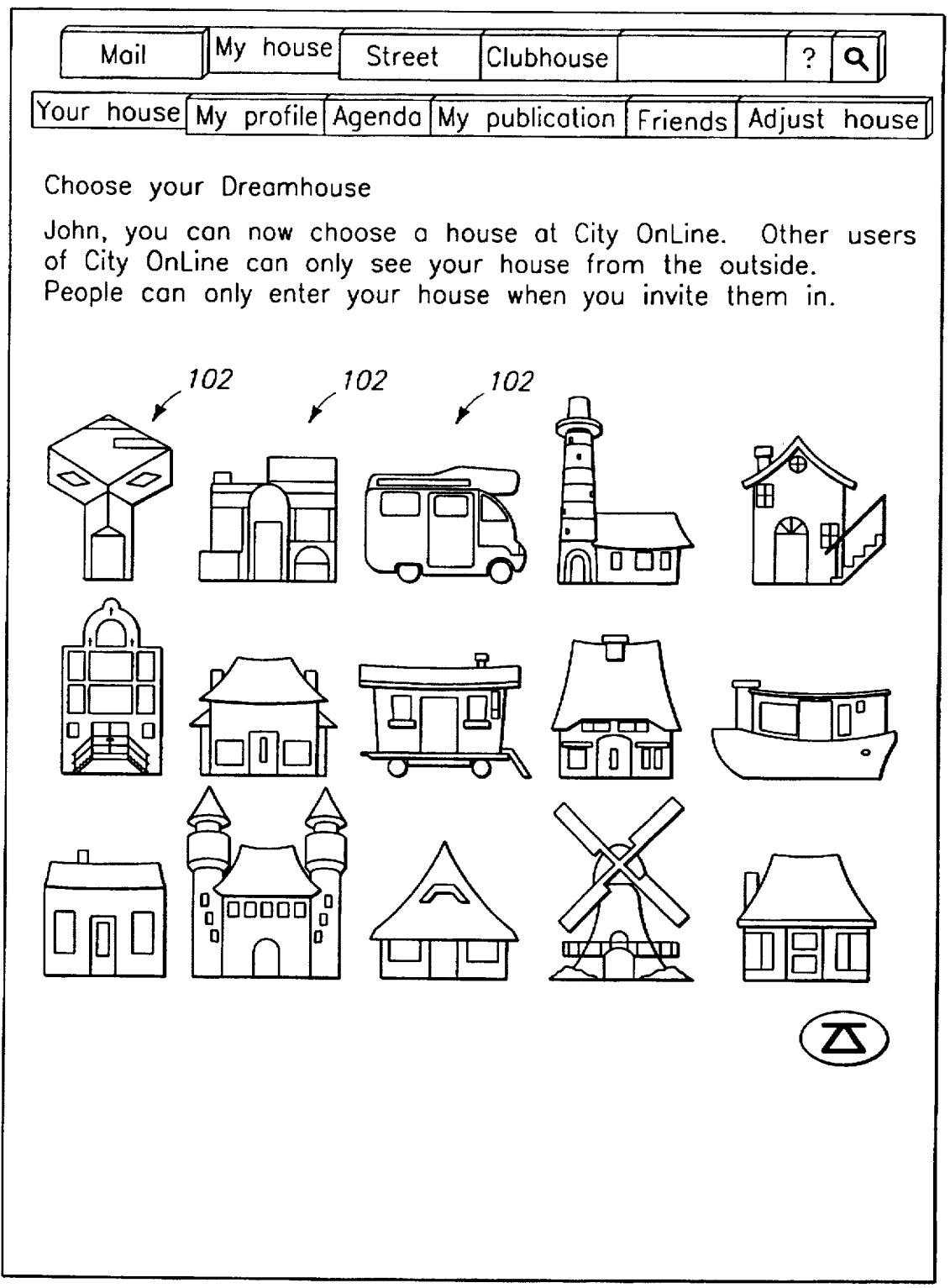

FIG. 9

| Mail | My house | Street | Clubhouse | | ? 🔍 |

| Your house | My profile | Agenda | My publication | Friends | Adjust house |

John, To create a street with other inhabitants who share the same interests that you have, you must first enter your own interests. When you enter the streets, you can get in contact with other inhabitants by clicking on their houses.
You have to mark at least ten subjects below.

News ← 112

110 →
- ☐ Economics
- ☐ Health
- ☐ Human interst/Gossip
- ☐ Flora & Fauna
- ☐ New Media (Internet)
- ☐ Education
- ☐ War
- ☐ Old Media (radio/tv)
- ☐ Police/Justice
- ☐ Politics
- ☐ Disasters
- ☐ Religion
- ☐ Traffic
- ☐ Weather
- ☐ Well-being
- ☐ Science
- ☐ Living

114

Adding up all your interests. At this moment you are a ...

← 116

- News hater
- Sport hater
- Culture hater
- Music hater
- Indoor hobby's hater
- Outdoor hobby's hater >6 marks=junkie
3-6 marks=lover
<3 marks=hater

Sports ← 112

- ☐ Other news
- ☐ Hockey
- ☐ Speed skating
- ☐ Skiing
- ☐ Tennis

⋮

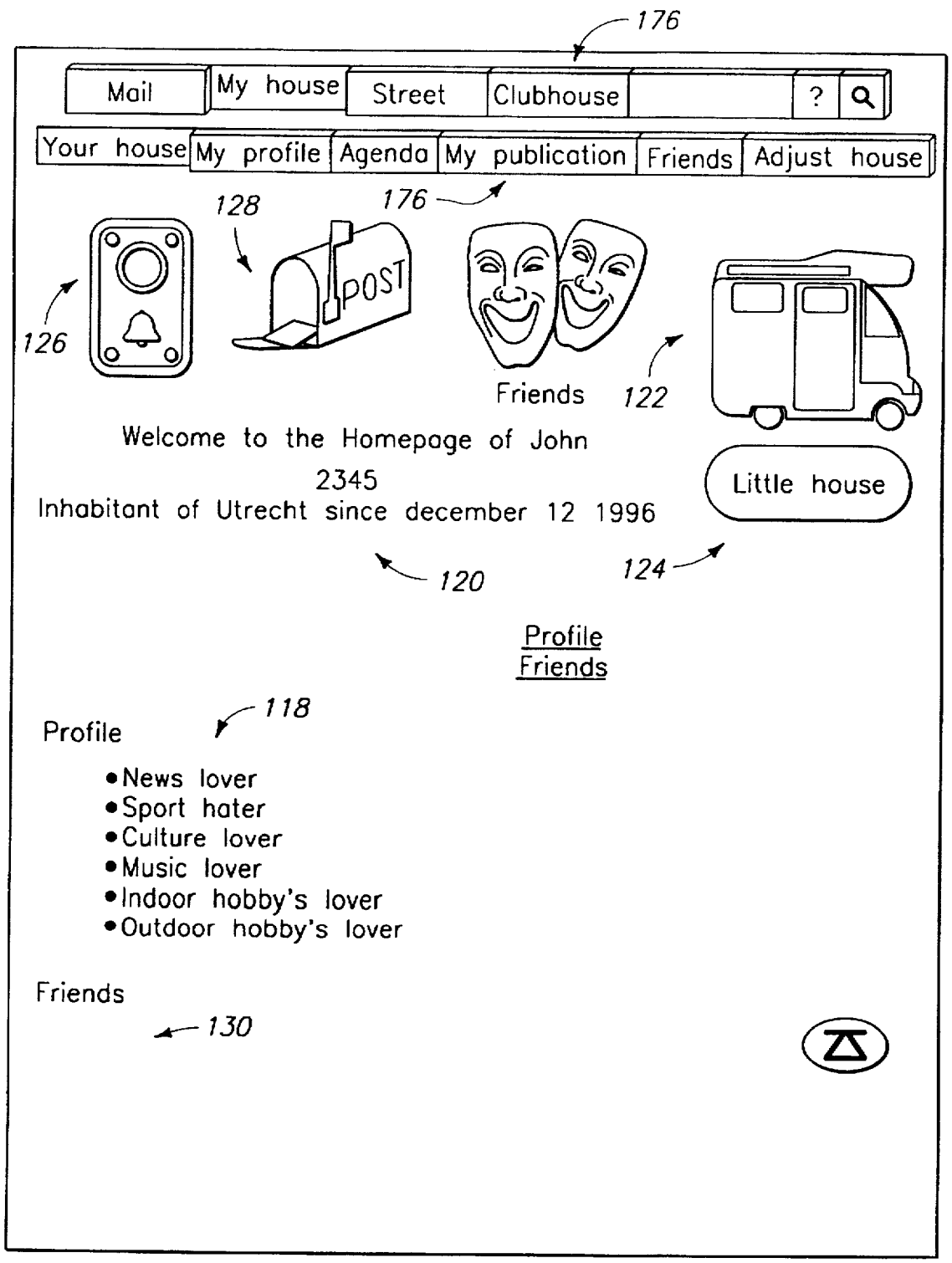

| Mail | My house | Street | Clubhouse | | ? | 🔍 |

| The Street | Profile Street | New Citizens | Clubhouse | Chatstreet |

John, below you can see the houses of the other City OnLine inhabitants. Click on a house to get to know more about the inhabitants, or to have a conversation., OnLine: ⦿ Yes ○ No preference ← 132

Postcode: ○ Apeldoorn ⦿ No preference ← 134         136

Age: ○ <25yrs  ○ <35yrs  ○ <50yrs  ⦿ 25-34yrs
     ○ 35-49yrs ○ 25-49yrs ○ 50+ ○ No Preference Sex: ⦿ Male ○ Female ○ No Preference ← 138

The street selection is based on: [ Online, Age, Male ]
                                                          142
                          [ Make street ]
                              ↖ 140

— 144

122        122

( My castle ) ( Little house ) ( My place ) ( Mi casa ) ( My home )

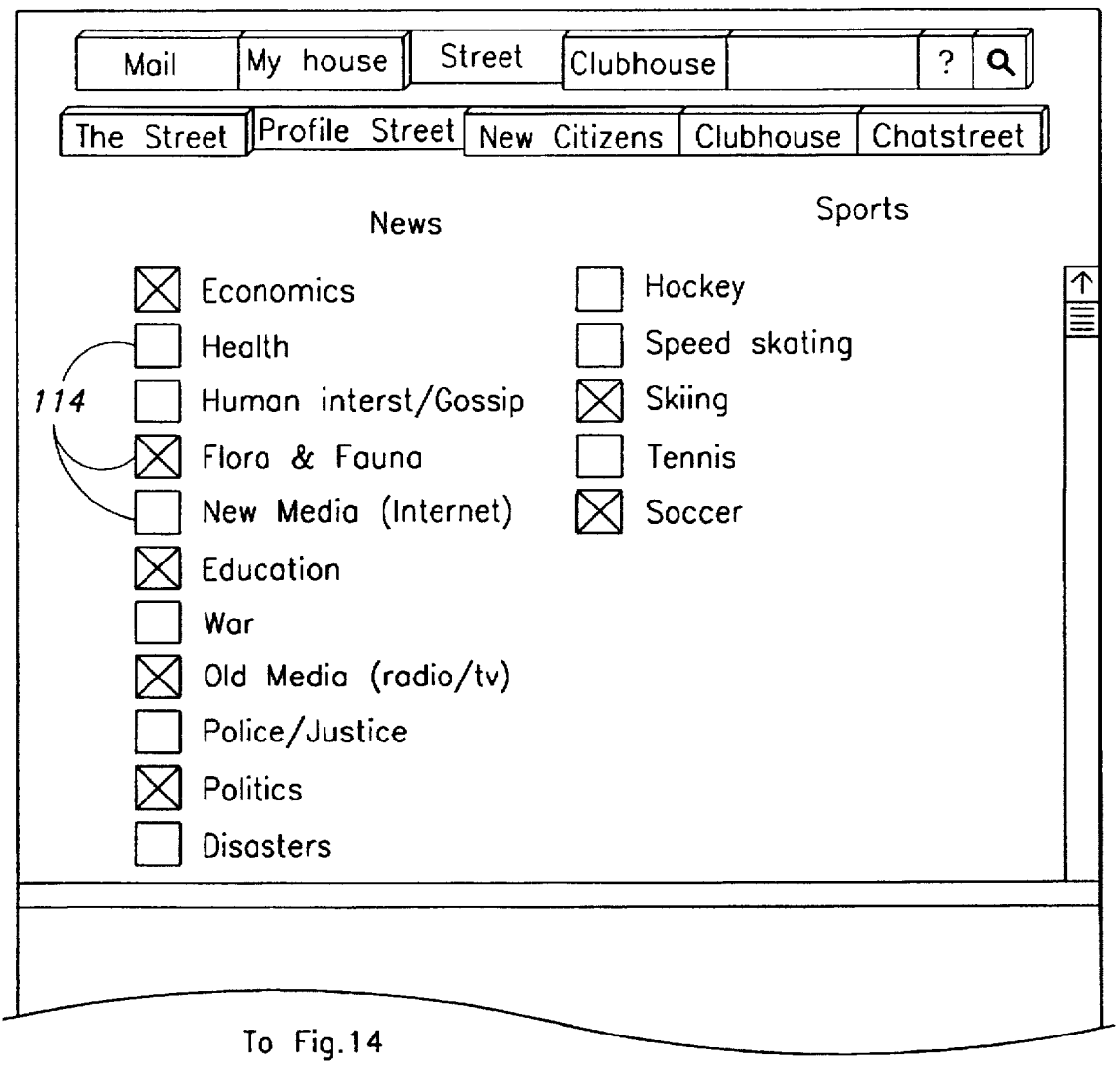

From Fig.13

John, below you can see the houses of the other City OnLine inhabitants. Click on a house to get to know more about the inhabitants, or to have a conversation., OnLine: ⦿ Yes ◯ No preference ← 132
Postcode: ◯ Apeldoorn ⦿ No preference ← 134      136
Age: ◯ <25yrs ◯ <35yrs ◯ <50yrs ⦿ 25-34yrs
◯ 35-49yrs ◯ 25-49yrs ◯ 50+ ◯ No Preference
Sex: ⦿ Male ◯ Female ◯ No Preference ← 138

The street selection is based on: | Online, Age, Male |

( Make street )  142
140

144

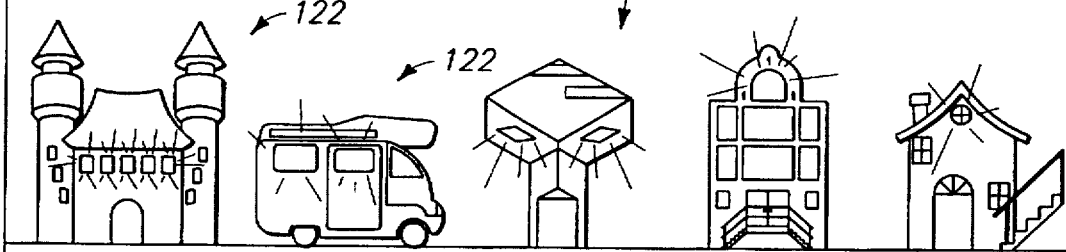

( My castle )  ( Little house )  ( My place )  ( Mi casa )  ( My home )
 

SYSTEM FOR PUBLISHING AND SEARCHING INTERESTS OF INDIVIDUALS

This application claims priority of U.S. Provisional application Ser. No. 60/014,662, filed Apr. 2, 1996.

TECHNICAL FIELD

The invention relates to systems including databases. More particularly, the invention relates to systems for designing databases and for displaying results of database searches. The invention also relates to computer networks.

BACKGROUND OF THE INVENTION

There are various ways in which individuals communicate their interests and locate others with similar interests, be it hiking, skiing, snowshoeing, traveling, fishing, flying, or other hobbies, particular occupations, particular types of cuisine, etc. For example, individuals may join clubs or organizations dedicated to a particular interest.

Individuals may subscribe to certain magazines or newsletters which are dedicated to a certain interest, and which have calendars of events, or articles relating to the particular interest.

Individuals may subscribe to video dating services, respond or place personals in newspapers, or call date lines to hopefully meet people of the opposite sex with similar interests.

These methods of communication are inefficient in that only a very few others learn of the individual's interests.

BRIEF DESCRIPTION OF THE DRAWINGS

Preferred embodiments of the invention are described below with reference to the following accompanying drawings.

Preferred embodiments of the invention are described below with reference to the following accompanying drawings.

FIG. 1 is a block diagram illustrating a system embodying the invention.

FIG. 2 is a block diagram illustrating in greater detail a computer and server included in the system of FIG. 1.

FIG. 3 is a flowchart illustrating steps involved in adding information to a database included in the system of FIG. 1.

FIGS. 4-5 provide a flowchart illustrating steps involved in searching the database included in the system of FIG. 1 in accordance with one embodiment of the invention.

FIGS. 6-15 illustrate one particular embodiment of the invention.

DETAILED DESCRIPTION OF THE PREFERRED EMBODIMENTS

Figure 8:
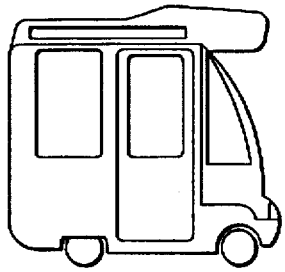

This disclosure of the invention is submitted in furtherance of the constitutional purposes of the U.S. Patent Laws "to promote the progress of science and useful arts" (Article 1, Section 8).

The disclose of the invention is submitted in furtherance of the constitutional purpose the U.S. Patent Laws "to promote the progress of science and useful arts" (Article 1, Section 8).

FIG. 1 illustrates a system 10 embodying the invention. The system 10 comprises a server 12, which can be a minicomputer, a microcomputer, a UNIX (TM) machine, a mainframe computer, a personal computer (PC) such as an Intel (TM) 286, 386, 486, Pentium (TM), or higher personal computer or clone thereof or Apple (TM), Macintosh (TM), or PowerPC (TM) personal computer or clone thereof, or any other appropriate computer. The server 12 includes typical components (see FIG. 2) such as a processor 20, RAM 22, and ROM 24, memory 26 (e.g. hard drive, disk drive, tape unit, CD-ROM, etc.), serial ports (not shown), and parallel ports (not shown). The term "memory" is intended to encompass storage media such as hard drives, computer disks, backup tapes, optical disks, network drives, flash cards, CD-ROM disks, etc. as well as hardware that read from and writes to the storage media. The system 10 further includes input devices (e.g.; keyboard 28 and mouse 30), output devices (e.g.; monitor 32 and printer 34), and communication hardware 36 connected to the server 12. The communication hardware 36 may either be internal or external, such as internal communication cards (e.g., modem card or network card) or external communication hardware (e.g., external modem), etc. The server 12 has a multi-user, multi-tasking operating system such as UNIX (if the server is a UNIX machine), Windows NT, LINUX (if the server is a personal computer), etc.

The system 10 further comprises (see FIG. 1) a plurality of clients 38, 40, 42, 44, 46, 48, 50, and 52. The clients comprise computers such as minicomputers, microcomputers, UNIX (TM) machines, mainframe computers, personal computers such as an Intel (TM) 286, 386, 486, Pentium (TM), or personal computers or clones thereof or Apple (TM), Macintosh (TM), or PowerPC (TM) personal computers or clones thereof, or any other appropriate computer, in any combination. In other words, the client 38 may be a different type of computer than the client 40, which in turn may be different from the client 42, etc. The clients 38, 40, 42, 44, 46, 48, 50, and 52 include typical components (see FIG. 2) such as a processor 54, ROM 56, RAM 58, memory 60 (hard drive, disk drive, tape unit, CD-ROM, etc.), serial ports (not shown), and parallel ports (not shown). The system 10 further includes input devices (e.g.; keyboard 62 and mouse 64), output devices (e.g.; monitor 66 and printer 68), and communication hardware 70, which may either be internal or external, such as internal communication cards (e.g., modem card or network card) or external communication hardware (e.g., external modem), etc. FIG. 2 shows only a single client 38; however, the other clients are of similar designs known in the art.

The clients 38, 40, 42, 44, 46, 48, 50, and 52 have loaded in memory 60 web browsers such as Mosaic, Netscape, Netcruiser, Explorer, etc. In one embodiment, one or more of the clients 16 also respectively have loaded in memory 60 virtual reality viewers. The term "virtual reality", as used herein, is not necessarily meant to describe the type of virtual reality that involves the use of gloves and helmets or goggles, but instead is used to describe the type of virtual reality that permits navigation through a scene, or manipulation of objects, using a mouse and keyboard, such as by using QuickTime VR, developed by Apple Computer, Inc., or the Virtual Reality Modeling Language (VRML). Virtual reality is discussed in greater detail in U.S. Pat. No. 5,737,533.

The clients are respectively connected to the server 12 via communication links. Some or all of the communication links may be either temporary links or permanent links. The communication links, for example, can comprise satellite links, RF links, LAN links, WAN links, telephone line links, or any link for permitting communication between computers, in any combination.

Although only a limited number of clients are shown connected to the server 12, in the illustrated embodiment, a large number of clients can be simultaneously connected to the server 12.

Different protocols may be employed for communication between the clients and the server 12. In the preferred embodiment, the TCP/IP protocol is employed for communication between the server 12 and the clients. More particularly, in the illustrated embodiment, the client connect to the server 12 via the Internet. In one embodiment, one or more of the clients are themselves servers maintained by service providers (e.g., Netcom (TM), CompuServe (TM), AmericaOnline (TM), etc.) which provide for communication between a large number of subscribers (or users) 72, 74, 76 and the server 12. In the illustrated embodiment, the client 50 is a server maintained by a service provider.

The server 12 has a database 78 defined in the memory 26. In the illustrated embodiment, the memory 26 comprises a hard disk drive having information arranged thereon to define the database 78, but could alternatively comprise one or more CD-ROMs, random access memory (RAM), read only memory (ROM), optical storage, tape storage, or any other appropriate data storage medium.

In one embodiment, the database 78 is a database of individuals, and contains pictorial information defining interests of the individuals, as will be described in greater detail below.

In one embodiment, the database 78 is a Wide Area Information Servers (WAIS) database. In alternative embodiments, the database 78 of the server 12 is a Sybase (TM), or Oracle (TM) database. Other forms of databases can be employed.

The memory 26 of the server 12 is also loaded with icon, graphics, and scenes, as will be described below in greater detail.

FIG. 3 illustrated steps involved in adding information to the database 78.

In operation, an individual connects to the server 12 using a client in step S1. The individual can choose a registration option, or a search option in step S2. If the registration option is selected by the user, the server 12 goes through a registration procedure. The individual follows steps of the registration procedure (described below in greater detail) using the client and having done so is registered in the database 78. Once this registration has taken place, users can find and make contact with people who meet a number of criteria in a number of ways. An important feature of the invention is that a registering individual is allocated a house, demonstrating his or her participation. Within the house, information about that individual is recorded in a visual manner.

The registration procedure comprises two parts:

A. A first part in which information is displayed visually (using the metaphor of the house or home).

B. A second part in which information about the individual is recorded in the database.

THE HOUSE

Individuals who use the system 10 are allocated their "home" in a particular way. The metaphor of the "house" is advantageous, for a number of reasons. It is a clear and attractive feature for both the registered individual ("resident") and individuals who search the database ("visitors").

After having answered a number of questions about himself or herself (see B: Content, below) the answers are sent to the server 12 in steps S4. The questions and answers may be sent using one or more forms, such as HTML (hypertext markup language) forms. HTML is a language used to create Internet web pages. Information relating to HTML and HTML forms can be found in *The HTML Sourcebook*, Ian S. Graham, John Wiley & Sons, Inc., 1995, and various other sources.

The resident is then given the opportunity to design his or her own "house." The resident is given a series of formats to choose from and a number of modular building blocks to build up the facade of his house. The combination of formats and modules means there are hundreds of possibilities. In alternative embodiments there are an even greater number of possibilities, with residents being able to make their own detailed designs. In one embodiment, the facade is two-dimensional.

In an alternative embodiment, three dimensional three-dimensional designs are created. This facade will exist in both a thumbnail format and as an enlarged version.

Next the resident is given the chance to design the house's interior, using a map or floor plan of different rooms in steps S7, S8, and S9. A major function of the different "rooms" is to represent the resident's interests. For example, one room is a hobby room; the resident can indicate to the server 12 his or her hobbies and these would be displayed in the form of items such as icons and text. Other rooms in addition to the hobby room include rooms such as a living room, kitchen, bedroom, library, plus a garden. By placing items in these rooms, the resident will allow visitors to form a picture of the resident. This approach offers a wide range of expansion opportunities both within the context described herein and within new contexts as technological innovation allows.

CONTENT

In step S3, which may take place before or after the resident has "built" his or her house, the resident is sent a form on which to record information about himself or herself (which may also affect the appearance of the house).

The following information is requested:

BASIC INFORMATION e-mail address (compulsory)

the resident's name and the name he wishes to give his own house (may be left blank)

zip code or postal code (compulsory)

sex (may be left blank)

age group (<12, 12–17, 18–24, 25–34, 35–49, 50–64, 65+) (may be left blank)

a password which must be used to change information in the future (if required) and for the resident to gain access to his or her own home.

In one embodiment, individuals can register only once. It will be possible to change the existing information about the resident. In one embodiment, the information cannot be changed very often, because this would unnecessarily complicate operation of the system 10. In one embodiment, the number of times information may be changed by residents is limited to twice a month, for example.

INTERESTS

All of the resident's interests are grouped to match one of the rooms of the house. A list of interests is displayed for each room (for example "sports," "classical music," "politics," "stamp collecting"). In steps S7, S8, and S9, for each interest, the resident is permitted (using free text format) to add words which further specify his or her interests. Thus, if the user has selected "stamp collecting," he or she might then type in text such as: "Israel, Jamaica, Cuba, Sport." For each interest the user selects, he or she has to indicate whether this is a special interest (high level of interest) or a regular interest (moderate level of interest). (If the user is not interested or barely interested he or she should not select a particular interest). For each interest an icon is also available which will ultimately be placed in the appropriate room. The icon will be shown in color to denote a special interest or in black-and-white for a regular interest.

Steps S10 and S11 relate to a number of restrictions which a resident may place on his visitors.

The resident is informed that by recording his details in the system there is a chance that someone will want to contact him by visiting his or her house. The resident may choose to exclude some potential visitors on the basis of certain characteristics. For example, the server 12 provides to the resident's client machine questions such as the following in step S10, and receives the results in step S11:

Do you wish to place any restrictions? Yes/No (if the answer is No, steps S10 and S11 have been completed)

If the answer is Yes, the following questions appear:

what sex should the visitor be? "doesn't matter", "male", "female"

what age should the visitor be? "doesn't matter" or one or more of the various age ranges distance from my own postal area? "doesn't matter", less than 25 kilometers, less than 100 kilometers All of this information is recorded and the resident is sent an e-mail message as confirmation. This message will also confirm this new resident's password. The resident is registered at once and can use the service immediately.

The house is the starting point for a user of the system 10. From here, residents can make contact in many different ways.

MAKING CONTACT

An Internet user can attempt to make a connection with one or more residents in two ways: the MATCH and FIND procedures.

MATCH

Searching for a connection using the system 10 is only possible if the "visitor" is registered and therefore has his or her own house.

If the resident is at home (i.e. has entered his or her password) he or she can start the search procedure. First he or she indicates which personal information he or she regards as important in steps S12 and S13:

sex, in other words he can answer "man", "woman" or "doesn't matter"

age: he can enter any or all of the age groups listed above, or "doesn't matter"

distance from the resident's own zip code or postal code, with possible answers being: 5, 10, 25, 50, 100 (e.g., kilometers), the Netherlands or no restriction.

Next, in step S14, matching persons are identified in the database, with the server 12 performing step S14 as follows.

Only those people who meet the requirements specified above are considered. Visitors must take account of the fact that a resident registered in the database may have placed restrictions on potential visitors. For example, if the resident has stipulated that a visitor must be a woman, then all men will be excluded. Hereinafter, the registered individuals who do qualify on the above criteria will be referred to as the "initial selection."

In one embodiment, the server 12 next compares the interests of the visitor and each of the other residents in turn; it notes how these interests are rated by the two individuals being compared. For each interest, the possibilities are: "special", "normal" and "none," and in the first two cases there may also be text attached.

The following procedure is then performed, in step S15, for all residents included in the initial selection:

only those who have at least one "special" interest in common with the potential visitor are retained. Let's call this the second selection. (If the list is empty, the user is informed that there is no match).

those residents who make the second selection are then sorted according to the degree of correspondence. The number of possible hits may be limited by the administrator of the system 10 or by visitors. In one embodiment, only up to 10 matches are provided to make the server 12 work more quickly).

In one embodiment, the degree of match is calculated using a points system. For example, the following points system is employed in the illustrated embodiment:

5 points for each special interest which the two users have in common.

2 points if one user has a special interest which the other has registered as a normal interest 3 points if the two users have a normal interest in common 2 points if one has a special interest and the other has not registered this as an interest.

Next, the individual words which were registered for each interest (if any) are compared to see if they match. 15 extra points are scored for each matching word related to a special interest. 5 extra points are scored if the word relates to an interest which both users have indicated is a 'normal interest', and if this is a special interest for one party and a normal interest for the other, the server 12 allocates 10 points.

The top matching individuals are selected from the database in this way.

In one embodiment, only one search is performed for steps S13, S14, and S15.

The thumbnails of the houses of the matching residents identified by the system will appear to the visitor as a "street."

By clicking on a thumbnail of a house the visitor then sees both the enlarged facade and the rooms with the icons representing the resident's interests, plus any text attached.

The icons inside the rooms are arranged so that the icons which match those of the visitor are displayed before those which do not!

Of course the basic information is also displayed there (but not the name of the individual or his or her e-mail address. However, the name of the house is displayed).

In this way the visitor can form a good picture of the individuals and houses he or she has visited and can choose someone to make contact with.

If the visitor fails to find someone he would like to make contact with he can repeat the procedure, but must then narrow or change his selection criteria.

(In the preferred embodiment, the server 12 performs repeat searches faster than the first search. In other words, the visitor does not necessarily have to run through the whole database again).

If the visitor chooses someone he would like to make contact with, the following will occur:

He is shown a box in which he can enter a personal message in step S17. A pretty postcard is sent to the mailbox of the selected individual's house.

Instead of a postage stamp, the postcard will bear the thumbnail picture of the sender's house.

The selected individual is notified via his or her e-mail address that there is mail waiting for him or her at his or her house. When the selected individual collects his or her mail, he or she can gain direct access to the sender's house by clicking on the thumbnail. If the selected individual likes the sender's house, the selected individual leaves a positive reply. The sender then receives a prompt at his/her e-mail address that a further message is waiting at the mailbox.

In both cases, if the addressee has not checked his mailbox for 48 hours, a new message will be sent. If he again fails to respond within 48 hours, a message is sent back to the sender informing him/her that the mail has not been collected.

Once real contact has been established, the individuals are free to communicate via the mailbox or using conventional e-mail.

FIND

This section is similar but not identical to MATCH. To use this option the user must also be a resident, but this time the search is made not using his own registered details, but in a slightly different manner:

In steps S18, S19, and S20, the initial choices relating to sex, age and postcode are the same as above, and the server 12 takes any restrictions into account in a manner similar to for the MATCH selection.

Next, in steps S21 and S22, the user chooses 1, 2 or 3 interests from the list (preferably adding one or more key words).

In step S23, the server 12 makes a search (this time it will present 25 'finds'). In one embodiment, only one search is performed for steps S20, S21, S22, and S23.

In step S24, at the top of the list will appear the thumbnails of those individuals who previously registered the same words (the more matches the better, with interests being evaluated according to the "special" and "normal" criteria as above). Next those individuals who also scored an interest as "special" but for whom there were no word matches are also listed (as thumbnails).

Individuals who score the same number of points are sorted according to the distance of their postal area from the visitor.

The rest of the procedure is the same as that described above for MATCH, except that this time the street is made up of a larger number of thumbnails, such as 25.

(In one embodiment, the server 12 includes in the street the thumbnails of companies or advertisers whose activities coincide with the interests of the user. A kind of embedded advertising, in other words).

MAINTENANCE AND STATISTICS

In the preferred embodiment, statistics are kept for the system manager's use.

The server 12 keeps a record of the total number of residents registered, how many matches have been requested in total, and the total number of finds requested. In one embodiment, the number of individuals registered is displayed as a counter when an Internet user reaches the home page of the system (not from the outset but rather once a critical mass has been reached, for example 5,000 users).

In one embodiment, units used will be week (format XXYY, with XX being the week number and YY the year). In one embodiment, the following information is recorded each week and passed on to the administrator of the system 10 (e.g., in a spreadsheet form, with the week numbers as consecutive columns):

the number of newly registered users the number of times the various components of the house format are chosen the number of match requests the number of find requests the number of reminders sent the number of mail items not read the number of times residents' information is changed the number of residents removed from the database at their own request the number of residents removed from the database for administrative reasons the number of hits on the home page the number of hits on the site In one embodiment, the following information is recorded for each resident:

the week number of registration the week numbers in which changes (to their information) were made the number of times a resident visited his own house and what he did there the date of his last visit the number of times mail was not collected the number of times MATCH was requested for each week number the number of times FIND was requested for each week number total MATCH requests total FIND requests plus a record of the addresses which he contacted.

In one embodiment, an automatic maintenance procedure is provided. It works as follows:

If someone has not logged into the system for three months, he or she is sent an e-mail message asking him or her whether he or she still wants to be registered in the system. An automatic procedure then asks him or her to confirm that he does want to remain registered or that wants to be removed from the database. If no reply is received within two weeks, he or she will be removed automatically.

If a resident fails to collect his mail three times in a row he or she will also be asked whether he or she still wants to participate (see above).

If someone tries to change their basic details too often they are sent a message that this is not permitted.

In one embodiment, there are also restrictions attached to the MATCH and FIND processes. In this embodiment, in order to prevent possible misuse, there is a limit of 25 MATCH sessions and 25 FIND sessions per week.

In one embodiment, the system manager is also able to remove an individual from the system manually, and to ensure that the user can no longer log in using an old user name or e-mail name.

Various alternative embodiments are provided for the system 10. In one embodiment, companies also promote themselves through the system and combine their own ranges/products/logos with the residents' houses.

It is worth noting that there are many ways of combining the houses as "streets", "villages", "cities", etc. New areas can be formed using all kinds of different criteria. In alternative embodiments, further items are placed in the rooms in addition to the icons representing interests. For example, in one embodiment, a resident "hangs" his or her own picture or one of his or her family in the living room. In one embodiment, a link to the resident's home page (if he has one) is added to his house.

FIGS. 6–16 illustrate screens generated by the server 12 in one specific embodiment of the invention, in which the Internet is used to connect the server 12 to the clients. Other embodiments are, of course, possible. For example, although the system is shown as implemented in an Internet environment, it can be implemented in other types of interactive media.

In order to access the system 10 and use its functionality, users are asked to store information in the database. This information includes two types of information:

1) Information that will be used as a unique identifier to identify a specific user amongst other users, such as nickname, zipcode, e-mail address, or a combination of these.

2) Information that describes the user, parts of which may be applicable to other users, i.e., a user's profile including information such as hobbies, favorite foods, etc.

Users are asked to choose a graphical element that will represent them to other users. In the illustrated embodiment, the user selects from a plurality of predefined graphical elements. More particularly, in the illustrated embodiment, the graphical elements are pictures of different styles of houses. In one embodiment, customized graphics are provided.

After the user completes the registration process, the user's information becomes part of the database, and the user will be able to retrieve information from the database.

As shown in FIG. 6, a user registers and builds a house by supplying information in various fields on a form supplied by the server 12 to a client 38, 40, 42, 44, 46, 48, 50, or 52. In the illustrated embodiment, the user building a house (owner of a house) is an individual; however, the owner of a house can be a group of users (e.g., a company). In the illustrated embodiment, the user enters data in a form including a field 80 for a nick name, a field 82 for a real name, a field 84 for a postcode (zip code), a field or fields 88 for an e-mail address, a field or fields 90 for a date of birth, a field 92 for sex, a field 94 for a password, a field 96 where the password must be re-entered to make sure it was entered correctly in the field 94, a field 98 for a reminder to aid a user in remembering the password when subsequently using the system 10, and a field with which the user can remove themselves from a mailing list (e.g., an e-mail mailing list).

After filling such fields, the user is prompted (FIG. 7) to select graphics (e.g., an icon or picture) for their house from a plurality of available pictures 102. In the illustrated embodiment, these pictures include, for example, illustrations of various modern looking houses, a mini-bus, a lighthouse, traditional looking houses, a wagon, a boat house, a castle, a windmill, a cottage, etc. Such selection is made in a conventional way, such as by clicking on a picture with a mouse, or highlighting a picture by positioning a cursor, then pressing an "enter" key, etc.

After selecting a picture, the user is prompted (FIG. 8) to select a device (slogans), which will appear adjacent the house, in an area 104. The selection may be made, for example, using a pull-down menu, or by entering text. The user is also permitted to provide a URL (location on the world wide web), where there exists a picture of the user, in an area 106. This picture will then appear in the user's house. The user is also permitted to enter text for a user's page (describe below) in an area 108.

The user is then prompted to enter his or her interests (FIG. 9). This can be done, for example, by making selections from a list 110 of possible interests. In the illustrated embodiment, there are a plurality of categories 112 of possible interests, and a plurality of possible interests 114 under each category. In the illustrated embodiment, the user makes a selection of an interest by marking a box (e.g., by clicking on a box). In the illustrated embodiment, the categories include news, sports, culture, music, indoor hobbies, and outdoor hobbies. In the illustrated embodiment, depending on how many interests a user chooses from a particular category, the user is classified, in a display area 116, relative to that category. For example, in one embodiment, if the user chooses less than three interests in a particular category, the user is classified as being a "hater" of that category. If a user chooses three to six interests in a particular category, the user is classified as being a "lover" of that category. If a user chooses more than six interests in a particular category, the user is classified as a "junkie" of that category. Other cuttoffs and classifications are possible.

FIG. 10 illustrates a screen sent from the server 12 to a client 38 when a user selects (e.g., clicks on) a house shown on a street (see FIG. 11 for an example of a street) and thereby visits the house. A profile for the person associated with that house (hereinafter referred to as "the owner of the house") is displayed in an area 118. Instead of a house being associated with and maintained by an individual, a house may be associated with and maintained by a group of people, a company, an organization, or a club, in which case the appearance of the house may be selected to have an appearance of a business, office building, or clubhouse, and the group, company, organization, or club would then be considered to be the owner of the house. In the illustrated embodiment, that profile corresponds to the classifications described above. The screen also indicates, in an area 120, how long that person has been an inhabitant of the street. The screen also illustrates, in areas 122 and 124, the picture of the house for that person, and the slogan selected by the owner of the house. The screen also has an icon, illustrated at 126, using which the user can contact the owner of the house. In the illustrated embodiment, if the icon 126 is selected (e.g., by clicking), and the owner of the house is on-line, a chat box opens (see FIG. 16) and the user can communicate with the owner of the house. In the illustrated embodiment, the icon 126 has the appearance of a doorbell. If the owner of the house is not on-line, the user can send an e-mail to the owner of the house, by selecting (e.g. clicking on) an icon, illustrated at 128, that also appears on the screen shown in FIG. 10. In the illustrated embodiment, the icon 128 has the appearance of a mailbox. The screen also has an icon, illustrated at 127, using which the user can indicate that he or she is a friend of the owner of this house. The user's friends are added to an address book (not shown) when the user chooses to send e-mail while not visiting a house. The screen also includes an area 130 where friends of the owner of the house are listed.

Users can query the database to select others based on one or more of the various fields described above (see FIGS. 11–14).

Figure 11:
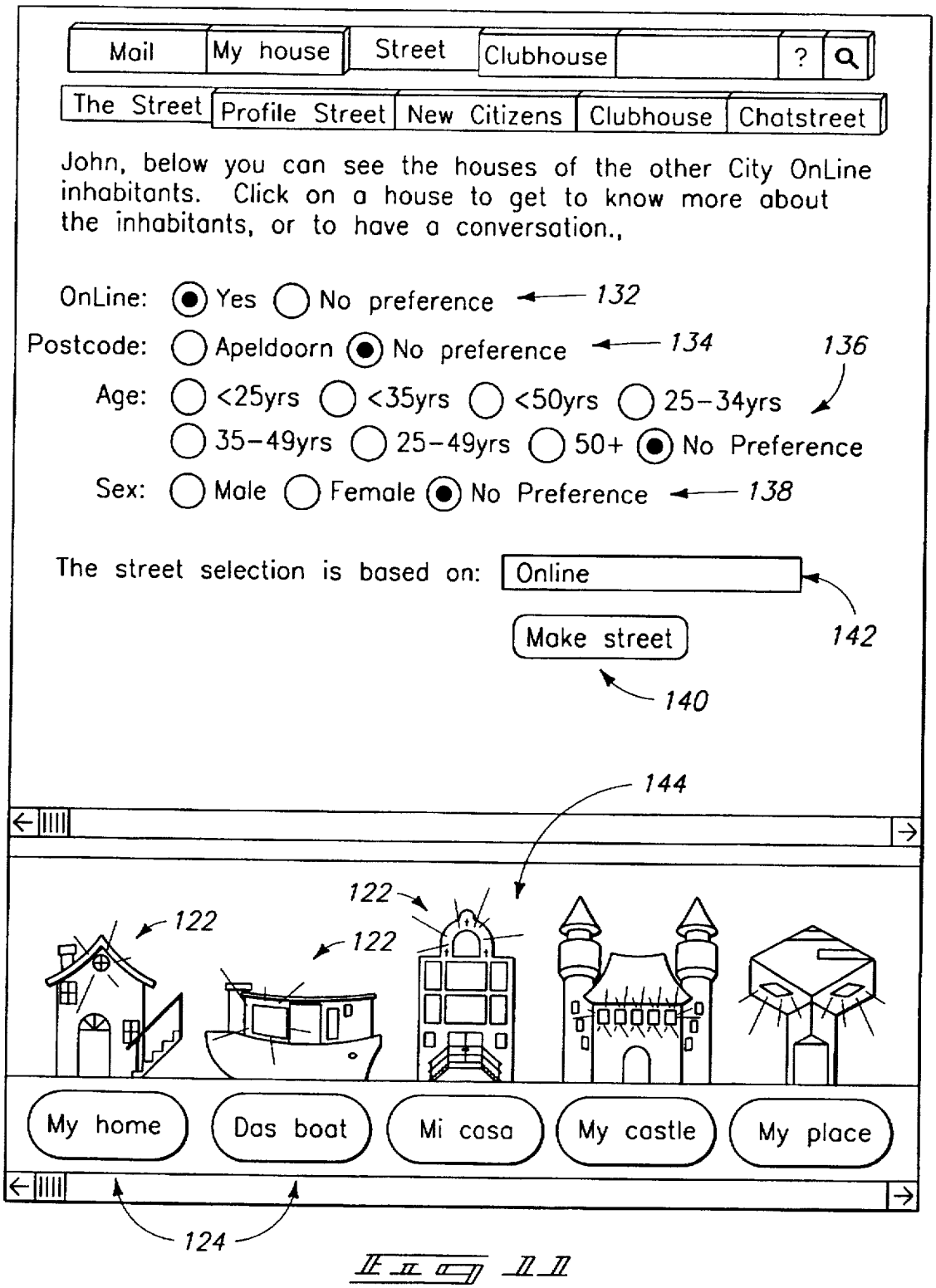

FIG. 11 illustrates a screen sent from the server 12 to a client 38, and showing fields using which a user can query the database. The screen includes a query area 132 using which the user can indicate whether the server should search only for houses whose owners are on-line, or whether the user has no preference, using predefined available selections. The screen shown in FIG. 11 further includes a query area 136 using which the user can limit the search to houses whose owners are of a specific age group, or can indicate that he or she has no age preference. In the illustrated embodiment, the user can select from predefined available selections such as less than twenty-five years old, less than thirty-five years old, less than fifty years old, twenty-five to thirty four years old, thirty-five to forty-nine years old, twenty-five to forty-nine years old, fifty or more years old, and no preference. Other predefined ranges can of course be employed. The screen shown in FIG. 11 further includes a query area 138 using which the user can limit the search to houses whose owners are of a particular sex, or can indicate that he or she has no age preference.

In the embodiment shown in FIG. 11, selections are made for querying the database using radio buttons (e.g., by click or tabbing). In alternative embodiments, selections can be made by checking boxes, by using pull-down menus, by entering text, or by any other appropriate method.

In many database environments, the information stored within the database is retrievable using a query language. However, in the illustrated embodiment, users of the system can retrieve information stored by other users without having to know complex query statements, and the result of such a query will be a representation of graphical elements. In the illustrated embodiment, the graphical elements define a street. This makes interpretation of the results of the search easy to use and understand.

The screen shown in FIG. 11 further includes a button 140 using which the user can initiate the database search. After the search is initiated, the selections made in areas 132, 134, 136, and 138 are displayed, as well as a text description, in area 142, indicating the search parameters for which the user had a preference, and a graphical depiction of a street or row 144 of houses whose owners satisfy the search criteria. In one embodiment, the search is also performed based, at least to some extent, on the interests of the user performing the search (see FIGS. 13–14). The slogans selected by the owner of the houses appear below the houses. Each time a query is made, a street is built which can be considered to be the neighborhood of the user, based on the user's requests at that time. In one embodiment, the houses depicted in the street 144 resulting from the search are ordered based on the real distance of the real houses of the users (based, e.g., on registered zipcodes). In one embodiment, the houses depicted in the street 144 having owners who are presently on-line are differentiated from houses whose owners are not presently on-line. More particularly, the lights are on in the houses depicted in the street 144 having owners who are presently on-line. More particularly, the houses depicted in the street 144 having owners who are on-line are illustrated as having the appearance of having lights on inside.

By clicking on a house shown in the street 144, a user can see additional information about the owner of the house. For example, the user can see a screen such as the screen shown in FIG. 10 and described above. (If the owner of the house is a club or organization, information about that club will appear.) The user can then contact the owner of the house. If the owner is on-line, a chat box or screen can be used to communicate (FIG. 16). The user invites the owner to chat by clicking on the icon 126 having the appearance of a doorbell. If the owner is off-line, the user can send e-mail to the owner's mailbox by clicking on the icon 128. Each house has its own mailbox In one embodiment (not shown), the street 144 shown on the screen in response to a database search includes advertising graphics. The advertising graphics can be in the form of billboards, shops, and/or offices. In one embodiment, the advertiser designs a billboard, and provides the designed billboard to the system 10. For example, the advertizer can indicate to the system 10 the location of a graphics file. This may include a URL if the network employed is the Internet, may include a drive and file name if the network employed is an Intranet network, a local area network, or a wide area network, or a graphics file may be transferred if a dial up connection is employed. In one embodiment, the advertiser can decide to have his billboard, store, or office appear on a street only when the user performing a search meets the advertisers pre-defined profile. In one embodiment, advertisers target their audience by e-mail to their mailbox in the house.

FIG. 12 is similar to FIG. 11, like reference numerals indicating like fields and items, except that FIG. 12 indicates the result of a search where the user performing the search through the database (the searcher) indicated that he or she preferred that the search be limited to houses having owners who are online, having owners twenty-five to thirty four years old, and who are male. Note that this results in a street 144 being formed which has houses different than the houses formed in the database search illustrated in FIG. 11.

FIGS. 13–14 are similar to FIGS. 11 and 12, like reference numerals indicating like fields and items, except that FIGS. 13–14 indicate interests 114 of the user (interests selected by the user) which are also used (in addition to the items shown in areas 132, 134, 136, and 138), at least to some extent, in performing a search. For example, while the search may not be limited strictly to owners of houses whose interests exactly match the interests indicated by the searcher, the closest matches may be selected based on individual interests 114 or based on how the user is classified (see area 116 in FIG. 9) for the various categories. In other words, relevance ranking is performed, with respect to interests, in one embodiment of the invention.

Figure 15:

FIG. 15 illustrates a screen using which a user can check his or her e-mail. The screen includes a graphical representation 146 of a mailbox, an area 148 where new mail items are listed or indicated, and an area 150 where items that already have been read are listed or indicated. In the illustrated embodiment, for new and previously read incoming mail items, the list includes a column 152 displaying the dates when the messages were received, a column 154 displaying the user identification names and numbers of the senders, and a column 156 displaying the subject of the received message. Other information may be provided. In the illustrated embodiment, a new or previously read e-mail message may be opened by selecting (e.g. clicking on) the subject of the message. Other methods of effecting opening of the e-mail may be employed.

FIG. 16 illustrates a screen using which a user can communicate in real time with other users. More particularly, FIG. 16 illustrates a chat screen. The screen shown in FIG. 16 includes an area 158 in which a user can enter information that is communicated to all users presently chatting (i.e., all users in the chat room). After entering the information, the user presses the return key or clicks on a button 160 to communicate the information. The screen includes an area 162 in which chat messages communicated by all users in the chat room appear. In the illustrated embodiment, the area 162 includes a column 164 for the time a message was sent, a column 166 for the user name and identification number of the user who sent the message, and a column 168 for the message itself. The screen further includes an area 170 listing all the users who are presently in the chat room. In the illustrated embodiment, the area 170 lists the user name and identification number of all users, and by clicking on a name you can see the house of that particular user (e.g., you can see information about the user presented on a screen having the organization of the screen shown in FIG. 10). The screen shown in FIG. 16 further includes an area 172 displaying the number of people chatting, the number of private chat sessions, and a link 174 using which a user can start a new chat session. Various selectable buttons 176 are provided at the top of the various screens for navigating between various screens.

Thus, a method and system have been provided for publishing and searching interests of users.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A system comprising:

a server having a memory, and a database defined in the memory; and a client in communication with the server, the server in operation communicating to the client a plurality of selectable graphics respectively having the appearance of a house, requesting a selection by a user of the client, receiving a selection from the client, and adding the selection to the database, the server in operation further communicating to the client a request for information identifying the user, receiving the information from the client adding the information to the database, and associating in the database the user with the house selected by the user.

2. A system in accordance with claim 1 wherein the houses whose associated users are in communication with the server have the appearance of being illuminated by a light interior of the house.

3. A server comprising:

a memory;

a database defined in the memory, the database including data about a plurality of users including interests of the users, the database further including fields representing possible interests of the users; and communication hardware providing for communication between the server and clients that connect to the server;

the server communicating to a client that connects to the server a request for data by providing a plurality of selectible differing graphics icons respectively having the appearance of a house, and the server receiving a selection from the client and adding the selection to the database and associating the selection with the user of the client, the server further communicating to the client a list of possible interests of the user, requesting a selection of interests of the user of the client, receiving a selection from the client, adding the selected interests to the database and associating the selected interests with the house icon selected by the user of the client;

the server communicating to a client which connects to the server a form for use in requesting a search of the database, and the server generating graphics having the general appearance of a plurality of houses after the search is performed, wherein the houses are respectively selectible using the client and wherein the server communicates to the client the interests of the user associated with a house if that house is selected.

4. A server in accordance with claim 3 wherein the server receives from a client which connects to the server an indication as to whether the user of the client desires to add data to the database or desires to search the database, and provides to the client a request for data or a form for searching the database depending on the response.

5. A server in accordance with claim 4 wherein, if the user desires to add data, the server communicates to the client a request for the user to provide a slogan which will appear adjacent to the user's house in response to a database search, and stores the provided slogan in the database and associates the slogan with the user's house.

6. A server in accordance with claim 4 wherein, if the user desires to add data, the server communicates to the client a request for the user to provide a location of a graphics file where there exists a picture of the user, and stores the location in the database and associates the location with the user's house.

7. A server in accordance with claim 3 wherein the list of possible interests communicated by the server to the client for selection of interests is in the form of a checklist.

8. A server in accordance with claim 3 wherein the list of possible interests includes categories of interests, and the user's level of interest is classified with respect to respective categories depending on the number of interests the user selects for respective categories.

9. A server in accordance with claim 3 wherein the houses whose associated users are in communication with the server are graphically distinguished from houses whose associated users are not in communication with the server.

10. A server in accordance with claim 3 wherein when the server communicates to the client the interests of the user associated with the selected house, the server further provides an icon which, if selected, launches a chat session between the user performing the search and the user associated with the house if the user associated with the house is in communication with the server.

11. A server in accordance with claim 3 wherein when the server communicates to the client the interests of the user associated with a house, the server further provides an icon which, if selected, addresses e-mail to the user associated with the house.

12. A method for publishing and searching interests of individuals, the method comprising:

providing a memory bearing software for performing the following:

providing to a user a request for data by providing a plurality of selectible differing graphics icons respectively having the appearance of a house, receiving a selection, adding the selection to a database and associating the selection with the user who made the selection, communicating to the user who selected a house icon a list of possible interests of the user, receiving a selection of interests from the user, adding the selected interests to the database and associating the selected interests with the house icon selected by the user who selected the interests, communicating to a user a form for use in requesting a search of the database, and generating graphics having the general appearance of a plurality of houses after the search is performed, wherein the houses are respectively selectible by the user, and communicating to the user who uses the search request form the interests of the user associated with a house if that house is selected.

13. A method in accordance with claim 12 wherein the software queries the user as to whether the user desires to add data to the database or desires to search the database, and provides to the user a request for data or a form for searching the database depending on the response.

14. A method in accordance with claim 13 wherein, if the user desires to add data, the software requests that the user provide a slogan which will appear adjacent to the user's house in response to a database search, and stores the provided slogan in the database and associates the slogan with the user's house.

15. A method in accordance with claim 13 wherein, if the user desires to add data, the software requests that the user provide a location of a graphics file where there exists a picture of the user, and stores the location in the database and associates the location with the user's house.

16. A method in accordance with claim 12 wherein the list of possible interests communicated to the user for selection of interests is in the form of a checklist.

17. A method in accordance with claim 12 wherein the list of possible interests includes categories of interests, and further comprising classifying the user's level of interest with respect to respective categories depending on the number of interests the user selects for respective categories.

18. A method in accordance with claim 12 wherein the houses whose associated users are on-line with a server using the software are graphically distinguished from houses whose associated users are not on-line with the server.

19. A method in accordance with claim 12 wherein the houses whose associated users are on-line with a server using the software have the appearance of being illuminated by a light interior of the house.

20. A method in accordance with claim 12 wherein when the software communicates to the user the interests of a user associated with the selected house, the software further provides an icon which, if selected, launches a chat session.

* * * * *

UNITED STATES PATENT AND TRADEMARK OFFICE
CERTIFICATE OF CORRECTION

PATENT NO. : 5,796,395
DATED : August 18, 1998
INVENTOR(S) : Maurice de Hond

It is certified that error appears in the above-identified patent and that said Letters Patent is hereby corrected as shown below:

Column 1, lines 37-39, please delete the text.

Column 1, line 50, replace "FIGS 6-15" with --FIGS. 6-16--.

Column 1, lines 60-63, please delete the text.

Column 4, lines 12-13, delete the second occurrence of "three dimensional".

Signed and Sealed this

Fifteenth Day of December, 1998

Attest:

Attesting Officer

BRUCE LEHMAN

Commissioner of Patents and Trademarks